(12) United States Patent
Hundertpfund et al.

(10) Patent No.: US 11,091,029 B2
(45) Date of Patent: Aug. 17, 2021

(54) APPARATUS FOR THE SHAPE-MATCHING AND/OR FORCE-FITTING FASTENING OF AN ELEMENT TO A VEHICLE FRAME

(71) Applicant: LIEBHERR-MINING EQUIPMENT COLMAR SAS, Colmar (FR)

(72) Inventors: Frank Hundertpfund, Schwanau (DE); Kai Kugelstadt, Lahr (DE)

(73) Assignee: LIEBHERR-MINING EQUIPMENT COLMAR SAS, Colmar (FR)

(*) Notice: Subject to any disclaimer, the term of this patent is extended or adjusted under 35 U.S.C. 154(b) by 264 days.

(21) Appl. No.: 16/325,835

(22) PCT Filed: Aug. 8, 2017

(86) PCT No.: PCT/EP2017/000962
§ 371 (c)(1),
(2) Date: Feb. 15, 2019

(87) PCT Pub. No.: WO2018/033238
PCT Pub. Date: Feb. 22, 2018

(65) Prior Publication Data
US 2019/0184821 A1    Jun. 20, 2019

(30) Foreign Application Priority Data

Aug. 17, 2016 (DE) .......................... 102016010010.9

(51) Int. Cl.
*B60K 15/067* (2006.01)
*B60K 15/063* (2006.01)

(52) U.S. Cl.
CPC .... *B60K 15/067* (2013.01); *B60K 2015/0636* (2013.01); *B60Y 2200/41* (2013.01)

(58) Field of Classification Search
CPC .............................. B60K 15/067; B60K 15/07
See application file for complete search history.

(56) References Cited

U.S. PATENT DOCUMENTS 2,357,148 A * 8/1944 Turner ................. B60K 15/067
  280/833
7,677,514 B1 * 3/2010 Palmer ................. B60K 15/067
  248/250

(Continued)

FOREIGN PATENT DOCUMENTS

CN   204210305 U * 3/2015
CN   204210305 U   3/2015

(Continued)

OTHER PUBLICATIONS

ISA European Patent Office, International Search Report Issued in Application No. PCT/EP2017/000962, dated Nov. 3, 2017, WIPO, 6 pages.

*Primary Examiner* — Kevin Hurley
(74) *Attorney, Agent, or Firm* — McCoy Russell LLP

(57) ABSTRACT

The invention relates to an apparatus for the shape-matching and/or force-fitting fastening of an element, preferably of a tank, to a vehicle frame having at least one upper fastening plate couplable to an upper region of the tank and having at least one lower fastening plate couplable to the tank thereunder, wherein the fastening plates are configured in particular to largely or exclusively conduct the weight force of the tank into a metal top boom plate and/or into a metal bottom boom plate of a longitudinal beam of the vehicle frame.

12 Claims, 8 Drawing Sheets

(56) References Cited

U.S. PATENT DOCUMENTS

| | | | |
|---|---|---|---|
| 8,381,955 B2 * | 2/2013 | Grater | B60R 11/00 224/547 |
| 2011/0233353 A1 | 9/2011 | Palmer | |
| 2015/0308077 A1 | 10/2015 | Arai et al. | |

FOREIGN PATENT DOCUMENTS

| | | | | |
|---|---|---|---|---|
| DE | 60116910 T2 | | 9/2006 | |
| DE | 102012217248 A1 | | 3/2014 | |
| EP | 2130747 A2 | * | 12/2009 | F01N 13/1822 |
| EP | 2130747 A2 | | 12/2009 | |

\* cited by examiner

APPARATUS FOR THE SHAPE-MATCHING AND/OR FORCE-FITTING FASTENING OF AN ELEMENT TO A VEHICLE FRAME

CROSS-REFERENCE TO RELATED APPLICATION

The present application is a U.S. National Phase of International Patent Application Serial No. PCT/EP2017/000962 entitled "DEVICE FOR FRICTIONALLY AND/OR INTERLOCKINGLY FASTENING A COMPONENT TO A VEHICLE FRAME," filed on Aug. 8, 2017. International Patent Application Serial No. PCT/EP2017/000962 claims priority to German Patent Application No. 102016010010.9 filed on Aug. 17, 2016. The entire contents of each of the above-referenced applications are hereby incorporated by reference for all purposes.

TECHNICAL FIELD

The invention relates to an apparatus for the shape-matching and/or force-fitting fastening of a tank to a vehicle frame having at least one upper fastening plate couplable to an upper region of the tank and having at least one lower fastening plate couplable to the tank thereunder, wherein the fastening plates are configured in particular to largely or exclusively conduct the weight force of the tank into a metal top boom plate and/or into a metal bottom boom plate of a longitudinal beam of the vehicle frame.

BACKGROUND AND SUMMARY

In apparatus of the category for the installation of vehicle tanks, in particular of mining vehicles, construction machinery, and similar units, fatigue cracks occur again and again in connecting weld seams between conventional tank fastening points and the vehicle frame to which the respective tank is fastened. In this respect, as is known, weld plates or consoles are attached or welded to the relatively weak webs or side panels 25 of the vehicle frames, which can result in said cracks under dynamic loads. This is related to the fact that the web panel has to take up additional torques and transverse loads via the weld plates known from the prior art. Bores for fastening the tank to the side panels and/or in the top boom are also known from the prior art; however, this likewise results in a weakening of the web panels or of the frame structure.

Against this background there is a need to provide an improved connection between a vehicle tank and a vehicle. It is therefore the object of the invention to further develop an apparatus of the category, wherein no weak points occur in the form of particularly frail connecting weld seams and wherein the connection of the tank frame and the vehicle frame is more durable and is therefore improved.

This object is achieved in accordance with the invention. Advantageous embodiments are the subject of the dependent claims. An apparatus is accordingly provided for the shape-matching and/or force-fitting fastening of objects such as a tank to a vehicle frame having at least one upper fastening plate couplable to an upper region of the tank and having at least one lower fastening plate couplable to the tank thereunder, wherein the fastening plates are configured in particular to largely or exclusively conduct the weight force of the tank into a metal top boom plate and/or into a metal bottom boom plate of a longitudinal beam of the vehicle frame. In accordance with the invention, the holders, fastening points, or fastening plates are arranged outside the greatly loaded regions of the vehicle frame and can be coupled to said vehicle frame without weakening the structure of the vehicle frame. It is in particular possible to completely dispense with weld seams for the fastening of the components and thus also with the structural weaknesses caused by the weld seams. The fastening plates do not have to be planar components, but can rather also have a complex geometry.

The invention can here be configured in the form of a multi-part console that is fastened by screws and clamping blocks to top booms and bottom booms, optionally especially shaped top booms and bottom booms, of the longitudinal frame beam or of the vehicle frame. The fastening is also conceivable at different parts of the vehicle than the top or bottom booms of the longitudinal beam. The installation points of the tank only have to be suitable to be able to hold the weight of the tank. In accordance with the invention, a fastening of the tank is made possible without critical weld seams at the vehicle frame side. The tank holder can thereby be designed as more durable.

It is conceivable in a preferred embodiment that the fastening plates are configured to be screwed to the metal top and/or bottom boom plates. Corresponding cut-outs and/or passages or bores can be provided at the fastening plates for this purpose. Corresponding cut-outs and/or passages or bores can also be provided at the metal top and bottom boom plates and the screws for the screw connection of the fastening plates can be led through them. The apparatus can hereby be particularly simply secured against slipping along the metal boom plates. The cut-outs or passages can be provided in multiple for or at different points at a metal boom plate so that different elements are also couplable by means of the fastening plates optionally at different points of the metal boom plates. It is furthermore conceivable that the fastening plates are configured such that they are screwable or fastenable both the metal top boom plate and to the metal bottom boom plate.

It is conceivable in a further preferred embodiment that the upper fastening plate and/or the lower fastening plate are configured at least partially in an L shape, with the upper fastening plate in particular being connectable, in particular screwable, to the metal top boom plate via an upper horizontal support region and being couplable to the tank via a vertical region, and/or with the lower fastening plate in particular being connectable, in particular screwable, to the metal bottom boom plate via a lower horizontal support region and being couplable to the tank via a vertical region. The L-shaped configuration here permits a particularly simple and stable shape of the fastening plates that makes their manufacture correspondingly inexpensive.

It is furthermore conceivable in a preferred embodiment that the upper fastening plate and/or the lower fastening plate each comprise two flat metal sections arranged with respect to one another, in particular in parallel with one another, and each comprise two flat metal sections arranged with respect to one another, in particular perpendicular to one another. The indication of the alignment of the sections is not to be seen as restrictive here and different alignments than the parallel and perpendicular alignments can also occur. The fastening plates can here in particular be produced from a flat metal piece in one piece that can be correspondingly burnt out, bent and/or welded. A stable connection of the tank with a geometry of the components used that is as simple as possible can be ensured by this configuration of the fastening plates. The flat metal sections of the fastening plates arranged perpendicular to one another can comprise one horizontal and one perpendicular component and make it possible to provide a stable coupling to a metal boom plate of the longitudinal beam via the horizontally formed component, while the perpendicular component of the fastening plates enables a coupling to the tank.

It is conceivable in a further preferred embodiment that two passages for receiving a pin are provided at the vertical region of the upper fastening plate, with the tank being couplable to the apparatus by means of the pin. Since more than one upper fastening plate can also be used, more than one single pin can accordingly also be provided overall. The use of a pin for coupling the tank simplifies the installation of the tank at the vehicle frame. An optionally required replacement of the tank is also facilitated by the comparatively simple release of the pin. An at least partially pivotable support of the tank at the remainder of the vehicle can furthermore take place by means of the pin, whereby the tank is pivotable with limitations when the vehicle sits on the ground via the tank. This can take place, for example, when traveling over very uneven terrain. The risk of damage to the tank can be reduced by a pivotable arrangement of the tank. A connection of the upper and/or fastening plate and of the tank is also conceivable by means of screws or other connection means.

It is conceivable in a further preferred embodiment that at least one bearing, in particular a rubber bearing, is provided between the lower fastening plate and the tank. The bearing can here damp a relative movement of the tank with respect to the vehicle frame and can hereby make the connection provided in accordance with the invention more resistant to loads, in particular vibration loads.

It is conceivable in a further preferred embodiment that at least two upper fastening plates are provided that have the same construction as one another and/or that at least two lower fastening plates are provided that have the same construction as one another. A particularly inexpensive production of the apparatus is hereby achieved since geometries that do not differ are necessarily required to carry out the invention. The individual fastening plates can also be kept comparatively small so that the material effort is correspondingly small.

It is conceivable in a further preferred embodiment that the upper and/or lower fastening plate can be coupled to the vehicle frame by clamping blocks of the same design. The clamping blocks here serve to fix the booms of the vehicle frame in cooperation with the fastening plates and further connection means such as screws. The design of the clamping blocks as components of the same design further simplifies the design of the apparatus in accordance with the invention in this respect.

It is conceivable that two respective upper and lower fastening plates are each spaced equally far apart from one another in the installed state of the tank. In this respect, a respective upper and lower fastening plate can in particular be arranged above one another at the vehicle frame in the installed state of the tank. On an observation of the fastening plates from the side, a mutually right-angled arrangement of the fastening plates can thus result. In particular tanks of an angular design can hereby be held in accordance with the invention at their lower or upper corner regions or can be fixed to the vehicle frame. A fixing of the tank to an upper edge and to a region disposed between the upper edge and a lower edge of the tank is here, however, equally also possible.

The invention further relates to a vehicle, in particular to a mining vehicle or to a construction machine, wherein the tank of the vehicle is coupled to the vehicle frame of the vehicle by means of an apparatus in accordance with the invention.

BRIEF DESCRIPTION OF THE FIGURES

Further details and advantages of the invention are explained with reference to the embodiment shown by way of example in the Figures. There are shown.

DETAILED DESCRIPTION

Figure 1:
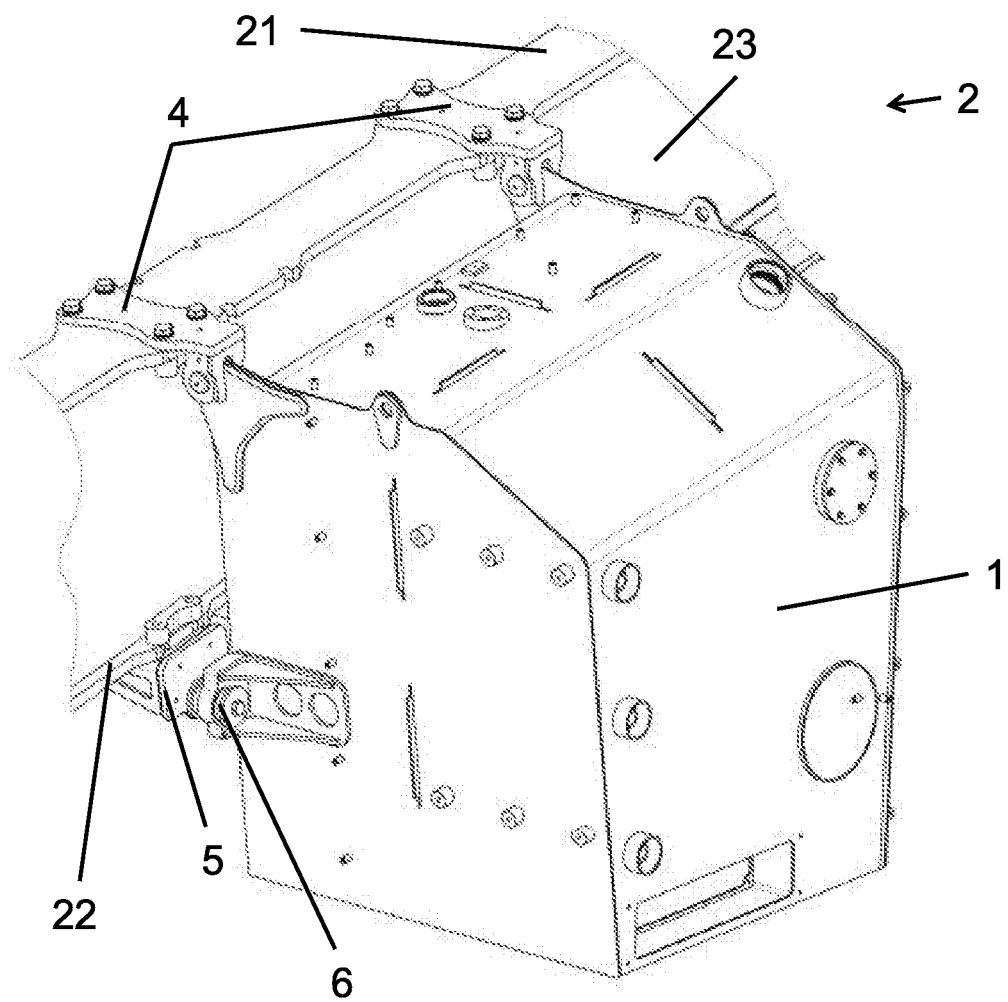
FIG. 1 shows a perspective view of an apparatus in accordance with the invention with a tank fastened to a vehicle frame.

FIG. 1 shows a perspective view of an apparatus in accordance with the invention for the shape-matching and force-fitting fastening of a tank 1 to a vehicle frame 2, wherein two upper fastening plates 4 at the upper region of the tank 1 and two lower fastening plates 5 thereunder can establish a coupling between the vehicle frame 2 and the tank 1. An embodiment is also conceivable in which a single, in particular one-piece, upper fastening plate 4 is provided in the upper region of the tank 1 and/or a single, in particular one-piece, lower fastening plate 5 is provided in the lower region of the tank 1. In this respect, for example, the tank 1 can be coupled to the vehicle frame 2 in its lower region using only one single clamped plate at a first lower fastening point, while a further lower fastening point of the tank 1 is supported on a frame part, in particular on a cast frame part, and without a second lower fastening plate 5. The weight force of the tank 1 is here largely or exclusively led into the metal boom plates of the longitudinal beam 23 of the vehicle frame 2 via the fastening plates 4, 5. The upper fastening plate 4 can here introduce a large portion of or the total weight force of the tank 1 into the metal top boom plate 21 of the longitudinal beam 23.

The tank 1 can, as indicated in FIG. 1, be coupled to the upper fastening plates 4, pivotably relative thereto, while the pivot movement of the tank 1 about the upper fastening plates 4 can be restricted or damped by an interaction between the lower fastening plates 5 and corresponding abutments at the tank 1. In this respect, bearings 6 can be provided between the lower fastening plates 5 and the tank 1. The tank 1 can thus be supported at least partially in a rotatable or damped manner at the vehicle frame 2, whereby a restricted protection of the apparatus is provided with unwanted introductions of force into the fastening plates 4, 5 due to ground contact of the tank 1, for example, or due to vibrations.

The fastening plates 4, 5 can each be screwed, pinned and/or connected, in particular releasably, to one another in a different manner to the metal top and bottom boom plates 21, 22. The introduction of weak points that can result with welded connections between the tank 1 and the longitudinal beam 23 is hereby dispensed with.

Figure 2:
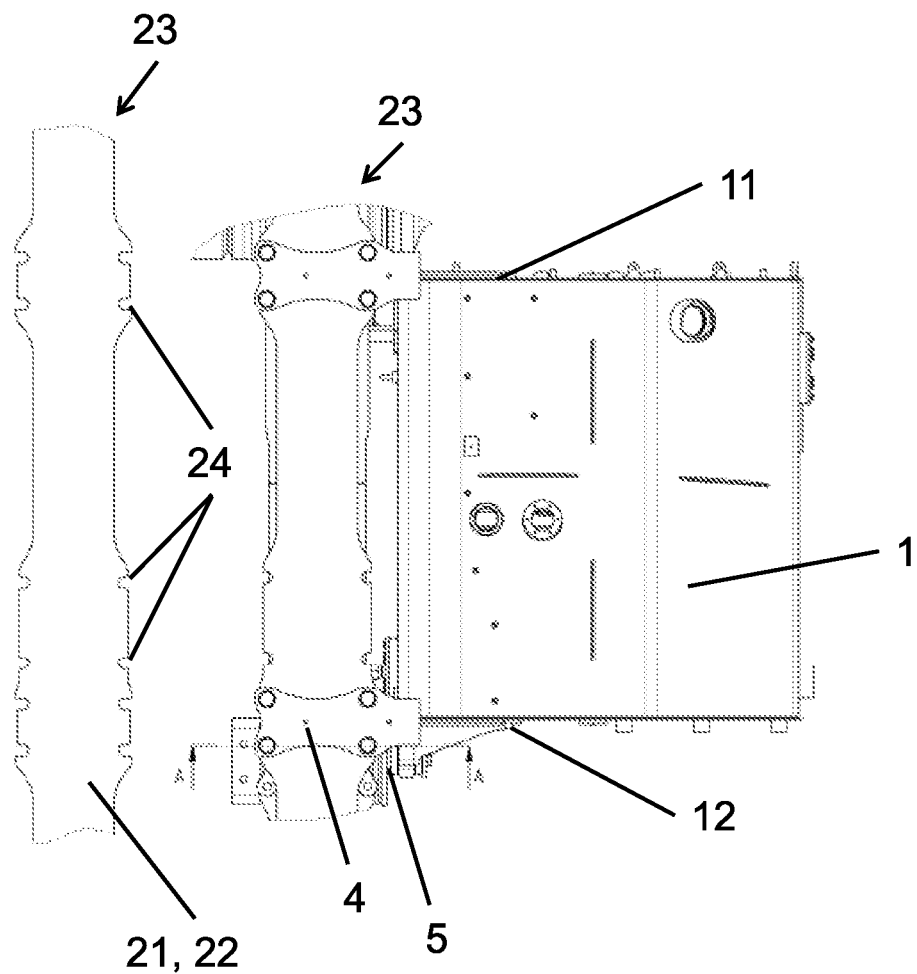
FIG. 2 shows a plan view of an apparatus in accordance with the invention with a tank fastened to a vehicle frame.

FIG. 2 shows a corresponding plan view of the tank 1 that is coupled to the longitudinal beam 23 of the vehicle frame 2 via the apparatus in accordance with the invention. The lower fastening plates 5 can here be arranged further outwardly at the tank 1 than the upper fastening plates 4. The tank 1 can hereby be fixed in a particularly simple and stable manner in the longitudinal direction of the vehicle by means of the lower fastening plates 5.

Cut-outs 24 that are formed for receiving corresponding screws by means of which the fastening plates 4, 5 can be fixedly screwed to the metal boom plates 21, 22 can be provided at the metal boom plates 21, 22, shown magnified in the left hand region of FIG. 2, of the longitudinal boom 23. A plurality of cut-outs 24 that enable the installation of differently dimensioned tanks 1 at the same metal boom plates 21, 22 can be provided at the metal boom plates 21, 22. The cut-outs 24 can, for example, be configured as bores and can in particular be provided in a sections of the longitudinal boom 23 or of the metal boom plates 21, 22 exposed to less strain. It is also conceivable to provide widened portions at the metal boom plates 21, 22 in whose regions the cut-outs 24 can be arranged. The widened portions can here be arranged at points of the metal boom plates 21, 22 at which no great loads are taken up by the metal boom plates 21, 22.

Upper and lower fastening plates 4, 5 can here be configured to be connectable or couplable at least partially to a front wall 11 and a rear wall 12 of the tank 1. These regions of the tank 1 can be kept simply accessible for installation engineers during the installation of the corresponding vehicle, whereby the installation of the tank 1 itself is simplified.

Figure 3:
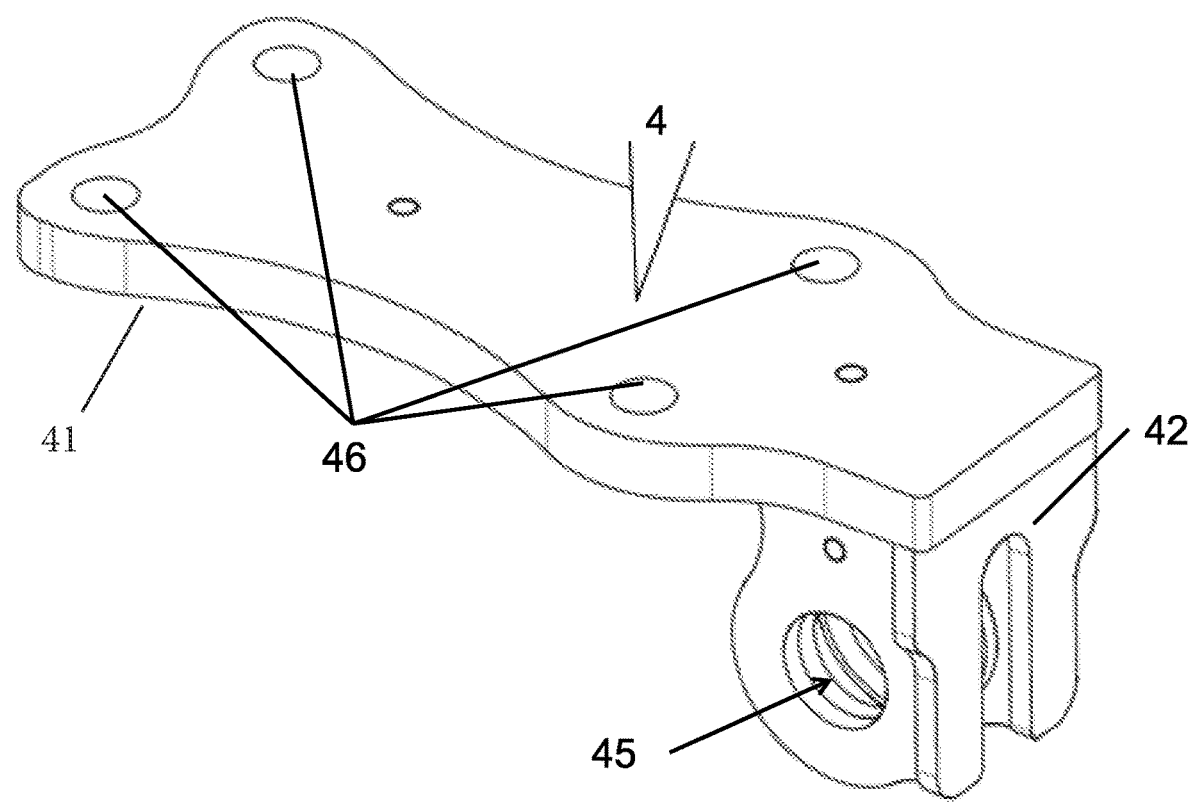
FIG. 3 shows a perspective view of an upper fastening plate of the apparatus in accordance with the invention.

FIG. 3 shows a perspective view of an upper fastening plate 4 that is configured in at least partial L shape on an observation in a longitudinal direction of the corresponding vehicle. The upper fastening plate 4 shown here in this respect comprises a horizontal support region 41 that corresponds to the lower side, not visible in FIG. 3, of the plate shown and that is positioned the top metal boom plate 21 or is connectable thereto. Passages 46 through which the corresponding fastening means can be led are provided in the support region 41 for this purpose. The vertical region 42 that can be arranged perpendicular to the horizontal support region 41 is in contrast couplable to the tank 1. In particular two passages 45 can be provided for the reception of a pin 44 shown below in the vertical region 42 of the upper fastening plate 4. The apparatus is couplable to the tank 1 by means of the pin 44.

The upper fastening plate 4 can be produced from four or fewer mutually welded flat metal elements having corresponding passages or cut-outs.

Figure 4:
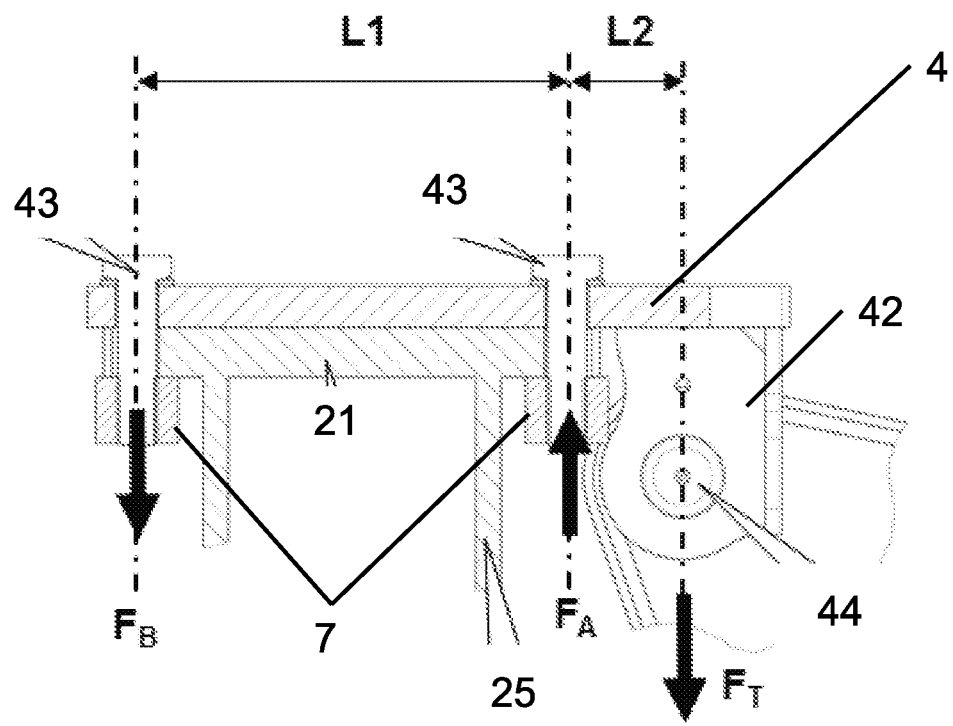
FIG. 4 shows a sectional view of an upper fastening plate of the apparatus in accordance with the invention in the installed state.

FIG. 4 shows a sectional view of the upper fastening plate 4 in a state installed at an metal top boom plate 21. The fastening plate 4 is here fastened to the metal top boom plate 21 by means of screws 43. A fastening point of the tank 1 is shown in the right hand region of FIG. 4. As can be seen from FIG. 4, a large portion of the weight force $F_1$ of the tank 1 is introduced into the metal top boom plate 21 as a force $F_A$ in the region of the screws 43 that are installed at the side of the fastening plate 4 facing the tank 1. An opposite force $F_B$ is introduced into the metal top boom plate 21 at the side of the upper fastening plate 4 disposed opposite the tank 1 via the screws 43 provided there.

The upper fastening plate 4 can furthermore have one or more pin bearings in its vertical regions 42 and can lie on especially shaped metal top boom plates of the longitudinal frame beam or of the vehicle frame 2. The shape of the metal top boom plate 21 on the one hand enables the simple positioning of the tank 1 in the installation; on the other hand, a good support of the upper fastening plate 4 is ensured, but also of the clamping block 7 shown below. The upper fastening plate 4 can be fastened by a respective two screws 43 and one clamping block 7 per side on the metal top boom plate 21, with the screws 43 being able to be disposed or positioned in cut-outs 24 of the metal top boom plate 21. The common axis of the fastening pins or pins 44 of both upper fastening plates 4 can be configured in parallel with the top boom 21 of the longitudinal beam or with the longitudinal beam 23. This makes it simpler to provide upper fastening plates 4 of the same design at the front and rear at the tank 1. The same part or element can likewise be used at the oppositely disposed frame side so that a second tank 1 can optionally be installed with an apparatus in accordance with the invention there.

As shown in FIG. 4, the weight force of the tank 1 $F_T$ can be introduced through the pins 44 into the upper fastening plates 4. Due to this arrangement, only compressive forces $F_A$ in the downward direction onto the metal top boom plate 21 or correspondingly upwardly acting counter-forces onto the upper fastening plates 4 act in the region of the outer screws 43 (at the right in the Figure). Only the screws 43 at the inside (at the left in the Figure) with respect to the vehicle geometry are therefore loaded by the tank's own weight, with the favorable lever relationship of, for example, L2/L1 effecting an advantageous conversion of the load at the inner (left) screws 43 into a tensile force $F_B$. It is likewise advantageous that the higher support forces at the outside (right) $F_A$ are introduced as compressive stress into the frame or into the metal top boom plate 21. In addition, the fastening of the tank 1 is not located as in other designs in the region of the relatively thin (vertical) side panel 25 of the longitudinal beam 23, but rather in the comparatively solid metal top boom plate 21.

Figure 5:
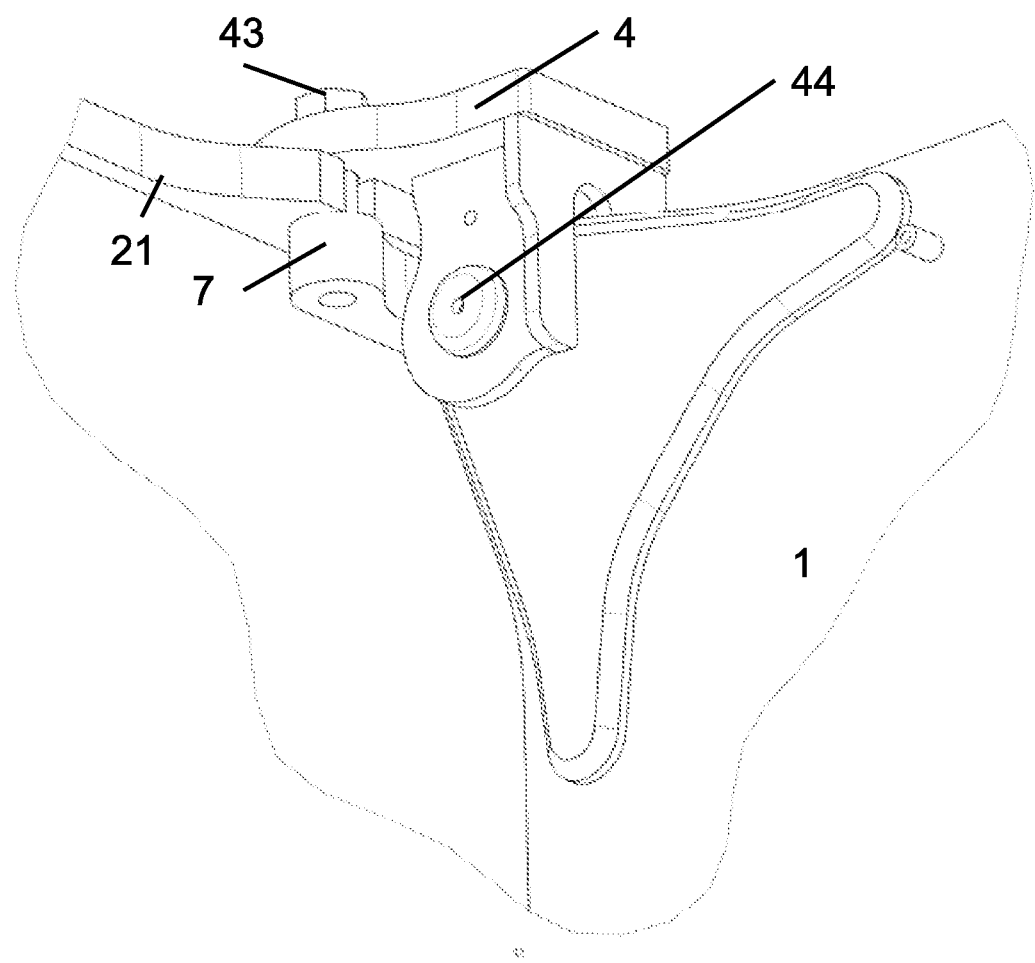
FIG. 5 shows a detailed view of a part of an upper fastening plate of an apparatus in accordance with the invention in the state installed at the tank.

FIG. 5 shows a detail of the apparatus in accordance with the invention, with the coupling of the upper fastening plate 4 by means of the pin 44 at the tank 1 being emphasized here. It can furthermore be recognized that the upper fastening plate 4 can be connected to the metal top boom plate 21 by means of a clamping block 7 and corresponding screws 43.

The pin 44 can here extend approximately so far in the longitudinal direction of the corresponding vehicle as the size of the spacing between two screws 43 for fixing the upper fastening plate 4. The screws 43 and pins 44 can here be arranged substantially perpendicular to one another.

Figure 6:
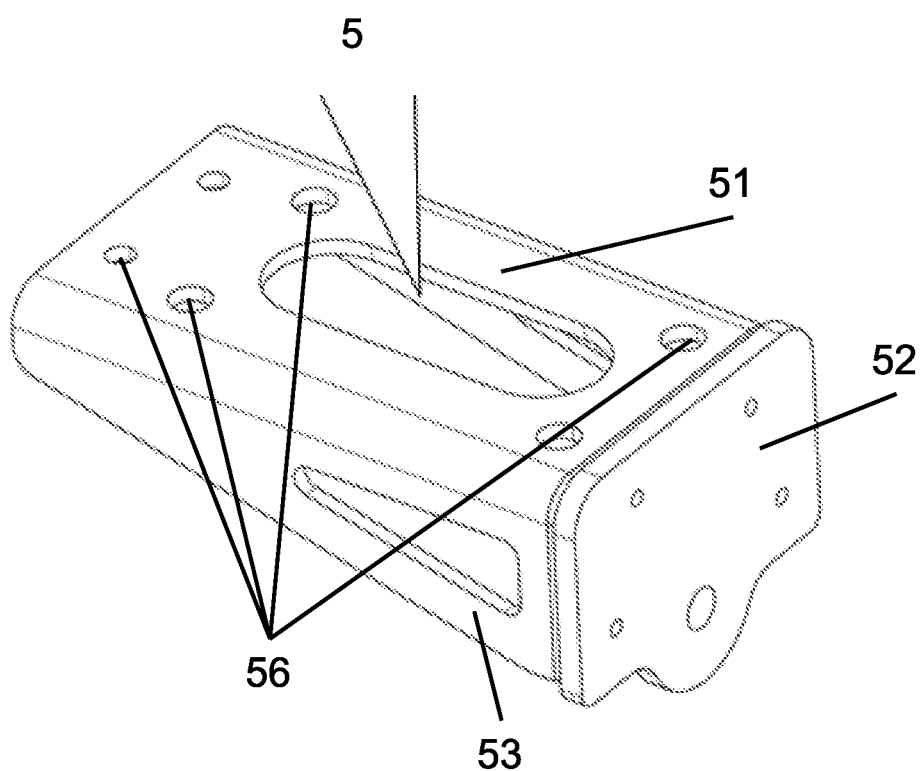
FIG. 6 shows a perspective view of a lower fastening plate.

FIG. 6 shows a perspective view of a lower fastening plate 5 that, like the upper fastening plate 4, can likewise be formed at least partially in L shape. The lower fastening plate 5 can be connectable to the lower boom 22 of the longitudinal beam 23 via a horizontal support region 51. For this purpose, corresponding cut-outs or passages 56 through which corresponding fixing means such as screws can be led are provided at the horizontal support region 51. The lower fastening plate 5 can furthermore comprise a vertical region 52 via which the lower fastening plate 5 is couplable to the tank 1. The vertical region 52 can here be configured as an abutment. The lower fastening plate can comprise two flat metal sections 53, 54 arranged in parallel with one another and two flat metal sections 51, 52 arranged perpendicular to one another. The rear flat metal section 54 is admittedly hidden in FIG. 6, but corresponds to the visible flat metal section 53 and can be symmetrical thereto. The mutually parallel flat metal sections 53, 54 can furthermore be arranged perpendicular to both mutually perpendicular flat metal sections 51, 52.

The mutually parallel flat metal sections 53, 54 and at least one of the other flat metal sections can here be configured in one piece, in particular from segments of a flat metal bent by 90° with respect to one another. It is also conceivable that both the lower fastening plates 5 and the upper fastening plates 4 are produced in one piece from correspondingly burnt out, bent, and welded flat metals.

Figure 7:
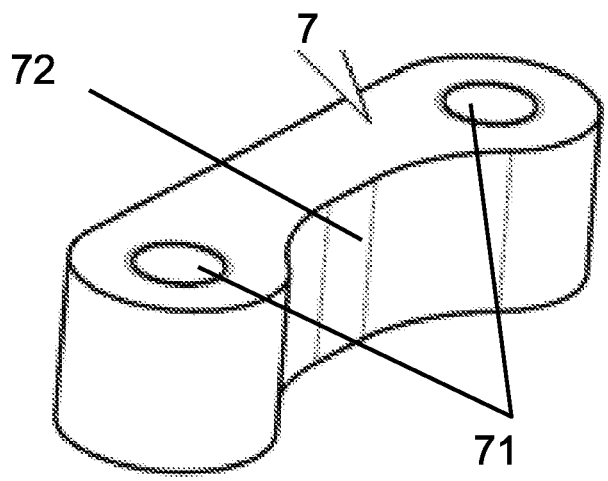
FIG. 7 shows a perspective view of a clamping block.

FIG. 7 shows a clamping block 7 that serves the fixing of the fastening plates 4, 5 to the metal boom plates 21, 22. The clamping block 7 can have two passages 71 for this purpose that are configured to receive the screws 43. A cut-out 72 can furthermore be provided at the clamping block 7 and makes it simpler to position the clamping block so that it does not collide with the tank 1. The vertical region 43 of the upper fastening plate 4 can in particular also be arranged at least partially in the cut-out 72 in an installed state of the apparatus.

Figure 8:
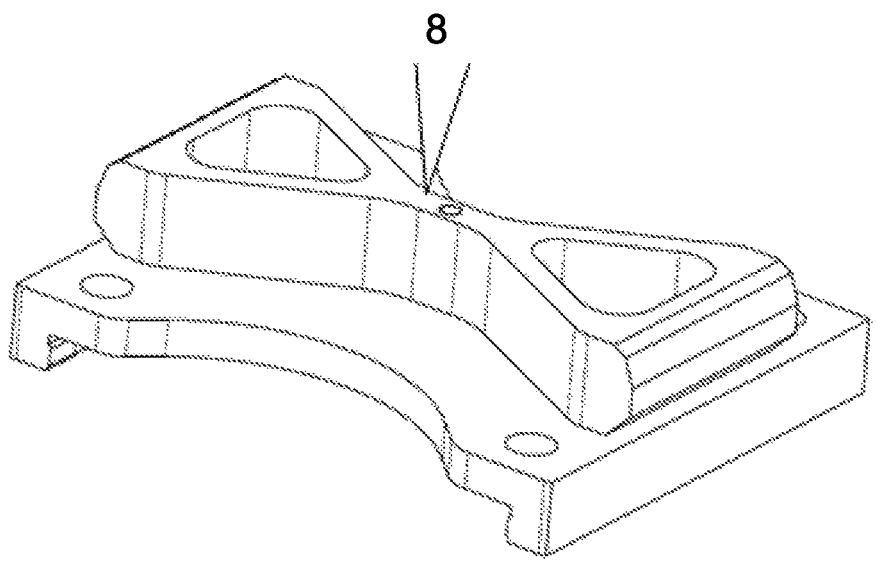
FIG. 8 shows a perspective view of a trough guide.

FIG. 8 shows a trough guide 8 that can be fastened to the metal boom plate 21, 22. Other elements can also be fastened to a vehicle frame 2 in the named manner in accordance with the invention beside the described fastening of tanks 1. This not only relates simply to consoles or switching cabinets, but railings or stages can, for example, also be simply fastened to the vehicle frame 2 for the carrying out of service work, for which purpose further cut-outs 24 can be provided in the metal boom plates 21, 22, for example. The shown trough guide 8 fixes a lowered dump trough to a counterpiece at the chassis frame or at the vehicle frame 2 and provides an optimum positioning and introduction of force from the dump trough into the vehicle frame 2 in the transport position. If the trough guide 8 wears, it can be replaced particularly simply and in particular without carrying out welding work or burning work.

The invention claimed is:

1. An apparatus for shape-matching and/or force-fitting fastening of a tank to a vehicle frame having at least one upper fastening plate couplable to an upper region of the tank and having at least one lower fastening plate couplable to the tank thereunder, wherein the fastening plates are configured to largely or exclusively conduct a weight force of the tank into a metal top boom plate and/or into a metal bottom boom plate of a longitudinal beam of the vehicle frame;
wherein the fastening plates are configured to be screwed to the metal top and/or bottom boom plates, with cut-outs and/or bores being provided at the metal top and/or bottom boom plates for this purpose.

2. The apparatus in accordance with claim 1, wherein a series of cut-outs and/or bores to which elements are to be fastened are provided at the metal top and/or bottom boom plates.

3. The apparatus in accordance with claim 1, wherein the upper fastening plate and/or the lower fastening plate are configured in at least a partially L shape, with the upper fastening plate being connectable via an upper horizontal support region and being couplable to the tank via an upper vertical region; and/or with the lower fastening plate being connectable to the metal bottom boom plate via a lower horizontal support region and being couplable to the tank via a lower vertical region.

4. The apparatus in accordance with claim 3, wherein two passages for receiving a pin are provided at the vertical region of the upper fastening plate, with the tank being couplable to the apparatus by means of the pin.

5. The apparatus in accordance with claim 1, wherein at least one bearing is provided between the lower fastening plate and the tank.

6. The apparatus in accordance with claim 1, wherein at least two upper fastening plates of a same design as one another are provided; and/or in that at least two lower fastening plates of a same design as one another are provided.

7. The apparatus in accordance with claim 1, wherein the upper and/or lower fastening plates are couplable by clamping blocks to the vehicle frame.

8. A vehicle, wherein a tank of the vehicle is coupled to a vehicle frame of the vehicle by means of an apparatus for shape-matching and/or force-fitting fastening of the tank to the vehicle frame, the apparatus having at least one upper fastening plate couplable to an upper region of the tank and having at least one lower fastening plate couplable to the tank thereunder, wherein the fastening plates are configured to largely or exclusively conduct a weight force of the tank into a metal top boom plate and/or into a metal bottom boom plate of a longitudinal beam of the vehicle frame;
wherein the upper fastening plate and/or the lower fastening plate each comprise two flat metal sections arranged with respect to one another, and each comprise two other flat metal sections arranged with respect to one another.

9. The apparatus in accordance with claim 3, wherein the upper fastening plate is screwable to the metal top boom plate, and/or wherein the lower fastening plate is screwable to the metal bottom boom plate.

10. The vehicle in accordance with claim 8, wherein the two flat metal sections are arranged parallel with one another, and wherein the two other flat metal sections are arranged perpendicular to one another.

11. The apparatus in accordance with claim 5, wherein the bearing is a rubber bearing.

12. The apparatus in accordance with claim 7, wherein the clamping blocks are of a same design.

* * * * *